United States Patent
Suryadevara et al.

(10) Patent No.: US 8,904,354 B2
(45) Date of Patent: Dec. 2, 2014

(54) RULE BASED SYNTAX SOFTWARE TEST CASE GENERATOR

(71) Applicant: CA, Inc., Islandia, NY (US)

(72) Inventors: Gopinath Suryadevara, Dallas, TX (US); Michael Hogan, Garland, TX (US); Kevin P. Shuma, Celina, TX (US)

(73) Assignee: CA, Inc., Islandia, NY (US)

( * ) Notice: Subject to any disclaimer, the term of this patent is extended or adjusted under 35 U.S.C. 154(b) by 130 days.

(21) Appl. No.: 13/731,961

(22) Filed: Dec. 31, 2012

(65) Prior Publication Data

US 2014/0189646 A1 Jul. 3, 2014

(51) Int. Cl.
*G06F 9/44* (2006.01)
*G06F 11/36* (2006.01)

(52) U.S. Cl.
CPC ................ *G06F 11/3684* (2013.01)
USPC ............ 717/124; 717/143; 717/144

(58) Field of Classification Search
CPC ............ G06F 11/3688; G06F 11/2664
USPC .......................... 717/124, 143, 144
See application file for complete search history.

(56) References Cited

U.S. PATENT DOCUMENTS 4,729,096 A    3/1988  Larson
5,421,004 A *  5/1995  Carpenter et al. .............. 714/25
5,678,052 A *  10/1997 Brisson ............................. 704/4
6,826,558 B2 * 11/2004 Slutz ..................................... 1/1
2006/0200772 A1* 9/2006 Dhanapal et al. ............. 715/760

FOREIGN PATENT DOCUMENTS

EP         0179334 A2    4/1986

OTHER PUBLICATIONS

Xaytsev, "The Grammar hammer of 2012", Dec. 19, 2012.*
"A SQL Test Case generator using Constraint Logic Programming", [Online]. Retrieved from the Internet: <URL: http://code.google.com/p/jstcg/>, (Accessed Dec. 19, 2012), 1 pg.
Ammann, Paul, et al., "Introduction to Software Testing: Chapter 5.2: Program-Based Grammars", [Online]. Retrieved from the Internet: <URL: http://cs.gmu.edu/~offutt/softwaretest/powerpoint/Ch5-2-source.ppt>, (Accessed Dec. 19, 2012), 21 pgs.

* cited by examiner

*Primary Examiner* — Phillip H Nguyen
(74) *Attorney, Agent, or Firm* — Schwegman Lundberg & Woessner, P.A.

(57) ABSTRACT

A system and computer implemented method includes receiving an input file containing a mark-up language based description of a syntax diagram having multiple elements and variations for multiple elements describing a set of test case queries, checking and validating the syntax diagram via a parser running on a processor, and generating and storing, on a computer readable medium, the set of test case queries by calculating permutations of the elements in the syntax diagram.

20 Claims, 4 Drawing Sheets

RULE BASED SYNTAX SOFTWARE TEST CASE GENERATOR

A copy of the source code on a CD-ROM, containing the file named 13731961-2586076US1.txt, which is 33 kilobytes (measured in MS-WINDOWS) and was created on Jun. 26, 2014, is herein incorporated by reference

BACKGROUND

The present disclosure relates to systems and methods to generate software test cases, and more specifically, to a rule based software test cases generator.

Database query languages, such as SQL, support a wide syntax of language elements that can be combined together in SLW queries to perform a wide variety of relational database activities. To certify that an implementation of an SQL syntax is correctly implemented, a large set of test cases, such as SQL queries are created to validate and exercise an SQL component of the database. The test cases are manually created, and run as a set of statically stored batch jobs.

BRIEF SUMMARY

A computer implemented method includes receiving an input file containing a mark-up language based description of a syntax diagram having multiple elements and variations for multiple elements describing a set of test case queries, checking and validating the syntax diagram via a parser running on a processor, and generating and storing, on a computer readable medium, the set of test case queries by calculating permutations of the elements in the syntax diagram.

In one embodiment, a computer program product includes computer executable code stored on a computer readable medium to execute a method. The method includes receiving an input file containing a mark-up language based description of a syntax diagram having multiple elements and variations for multiple elements describing a set of test case queries, checking and validating the syntax diagram via a parser running on a processor, and generating and storing, on a computer readable medium, the set of test case queries by calculating permutations of the elements in the syntax diagram.

A system includes a test case generator running on a processor to receive an input file containing a mark-up language based description of a syntax diagram having multiple elements and variations for multiple elements describing a set of test case queries. A parser running on the processor, checks and validates the syntax diagram. The test case generator further generates and stores, on a computer readable medium, the set of test case queries by calculating permutations of the elements in the syntax diagram.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
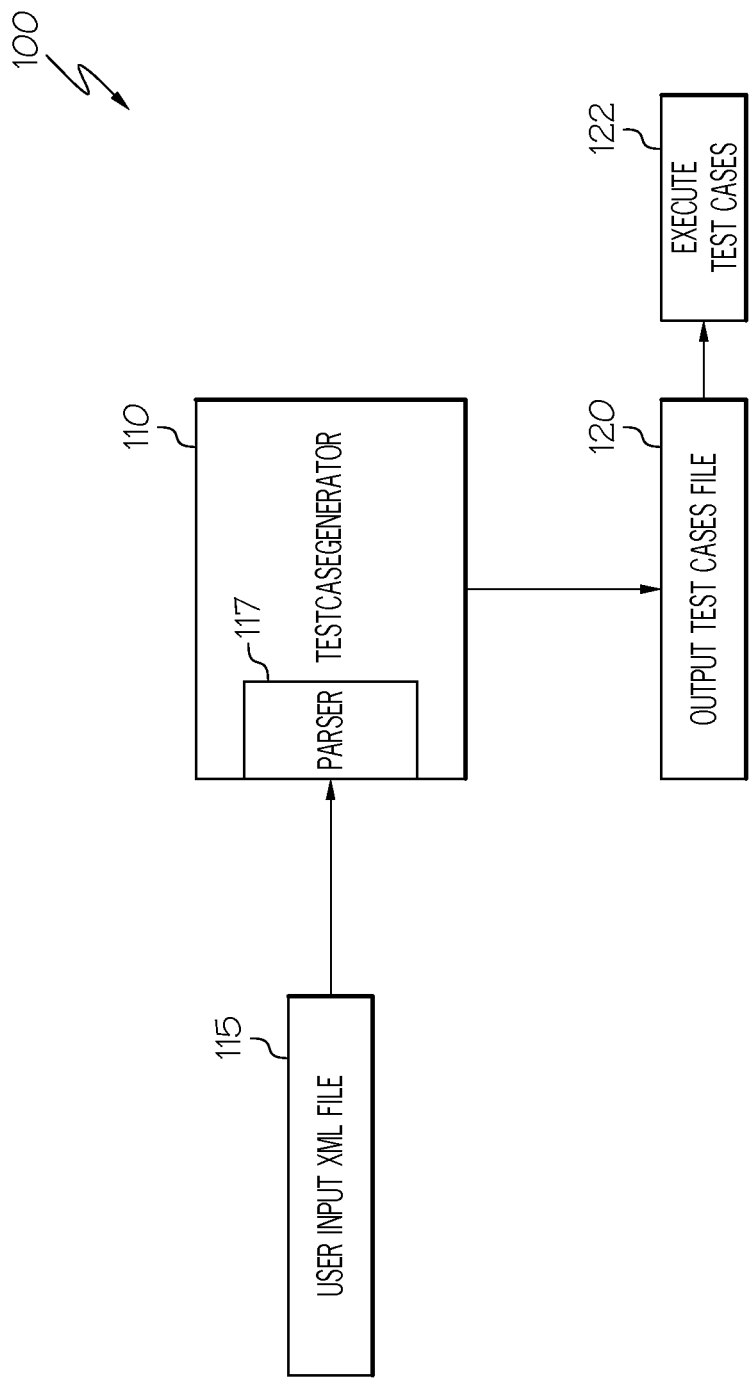
FIG. 1 is a block diagram illustrating a test case generator according to an example embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure maray take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a block diagram of a system 100 that combines the flexibility of the XML language to define, store and manage SQL syntax elements so that they can be easily combined to build (generate) complete/complex SQL queries for processing against a query language engine, such as a Datacom SQL engine.

A test case generator 110 accepts an input XML file 115 specified via an argument, parses the custom XML elements via a parser 117 and generates values for marker elements based on the rules specified via the XML tags and writes test cases to an output file 120, passed as an argument. The output file may be fed into a system to run the test cases at 122. In one embodiment, the same system may execute the test case generator 110 and run the test cases in real time as they are generated.

Figure 2:
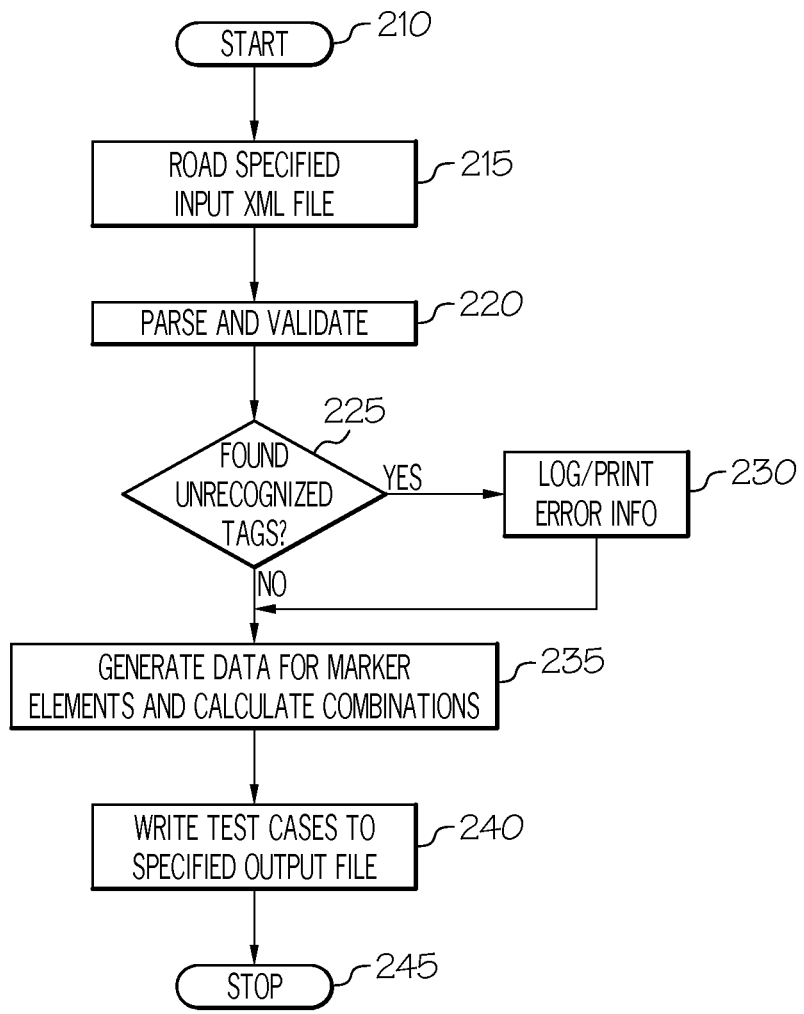
FIG. 2 is a flowchart illustrating a method of generating test cases from a mark-up language representation of a syntax diagram according to an example embodiment.

FIG. 2 illustrates a method 200 of generating test cases in flow chart form. Starting at 210, a specified input xml file is read at 215. In further embodiments, the input file may be written in another form of markup type language. At 220, the test case generator parses and validates the input file. If at 225, unrecognized tags are found, an error may be logged and or printed with information identifying the error at 230. If the input file is validated, processing proceeds directly to generate data for marker elements and combinations are calculated at 235. This may also be done following identification of errors at 230 in some embodiments. At 240, the generated data is written as test cases to a specified output file. The method stops at 245.

Figure 3:
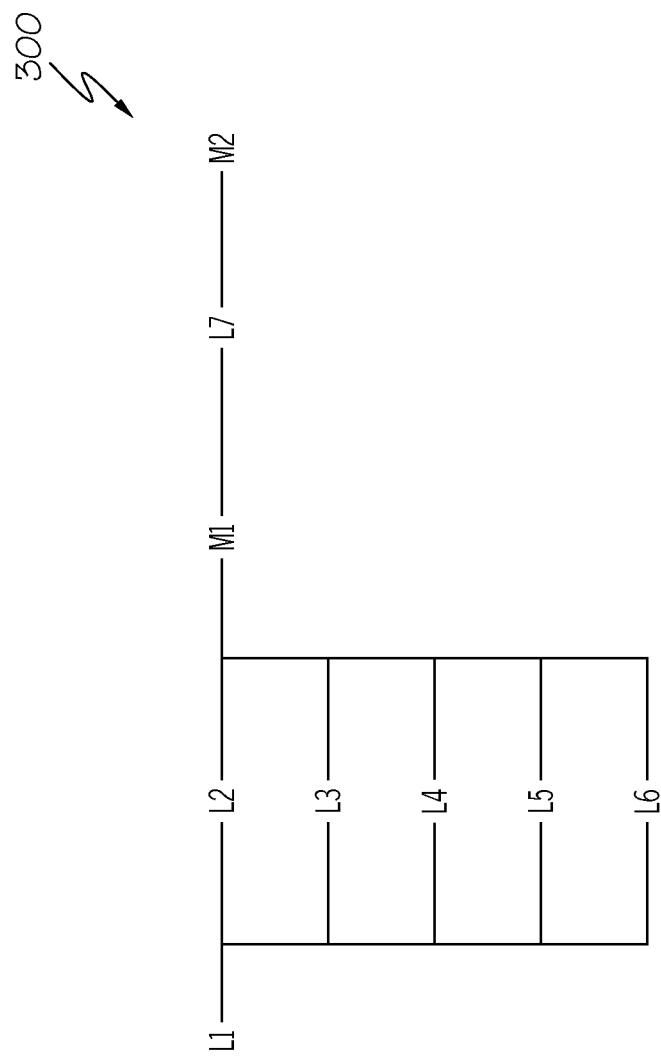
FIG. 3 is an example syntax diagram utilized to generate test cases according to an example embodiment.

In one embodiment, SQL test cases may be generated from a syntax diagram expressed in xml. A simplified example is provided to illustrate operation at a basic level:
L→Literal Text
M→Marker
R→Rule An example syntax diagram as shown in FIG. 3 at 300. The syntax diagram contains seven instances of literal text, labeled L1, L2, L3, L4, L5, L6, and L7. There are also two markers, M1 and M2. Literal text arranged in a column includes five instances, L2-L6, which are essentially alternative choices of text. The possible combinations of valid syntax given that M1 and M2 are valid and bound by Rules R1, R2, R3 would include five test cases corresponding to the five alternative combinations of text as represented by the second string of literal text in each item in the following list:

L1  L2  M1  L7  M2

L1  L3  M1  L7  M2

L1  L4  M1  L7  M2

L1  L5  M1  L7  M2

L1  L6  M1  L7  M2

Marker M1 may be resolved into a single entity or may be a set of multiple entities generated based on the rules. Say M1 when parsed results in a set of entities M11 M12 M13. Similarly, say Marker M2 results in a set M21 M22. Now the possible combinations of valid syntax expand each entry in the list above to six entries with variations of M1 and M2:

L1  L2  M11  L7  M21

L1  L2  M11  L7  M22

L1  L2  M12  L7  M21

L1  L2  M12  L7  M22

L1  L2  M13  L7  M21

L1  L2  M13  L7  M22

L1  L3  M11  L7  M21

L1  L3  M11  L7  M22

L1  L3  M12  L7  M21

L1  L3  M12  L7  M22

L1  L3  M13  L7  M21

L1  L3  M13  L7  M22

...

L1  L6  M11  L7  M21

L1  L6  M11  L7  M22

L1  L6  M12  L7  M21

L1  L6  M12  L7  M22

L1  L6  M13  L7  M21

L1  L6  M13  L7  M22

The syntax diagrams effectively expand the number of test cases by the number of variations of each of the elements in the row. The variations of the literal text and the markers are referred to as sets, with the number of elements in each set being multiplied together to form a product equal to the number of text cases. In some embodiments, there may be multiple separate syntax diagrams.

A CREATE TABLE sql query is now described as an example. Note that the names are descriptive in the example, but may be changed to any names desired in various implementations. Files in an example folder named CREATE_TABLE_DEF.xml and CREATE_TABLE_QUERY.xml are input to the parser program along with a definitions file referred to as SQLCOMP_COMMON_DEFINITIONS.xml. The common definitions file defines curtain elements used across all the queries like a COLUMN NAME, TABLE NAME.

The query.xml is the xml representation of the SQL syntax diagram. A parser program 117 written in java in one embodiment, reads the xml input files, parses the query, generates markers based on the rules, figures out the combinations and writes SQL queries to an output file, CREATE_TABLE_QUERY_SAVE.txt in this case.

The xml tags that are used, like <DEFINITIONS>, <ITEM>, <MARKER> are not any standard names. They can be renamed and accordingly, the parser program would be changed to parse and act on those new tags.

Example files are now set forth in the order described above.

Figure 4:
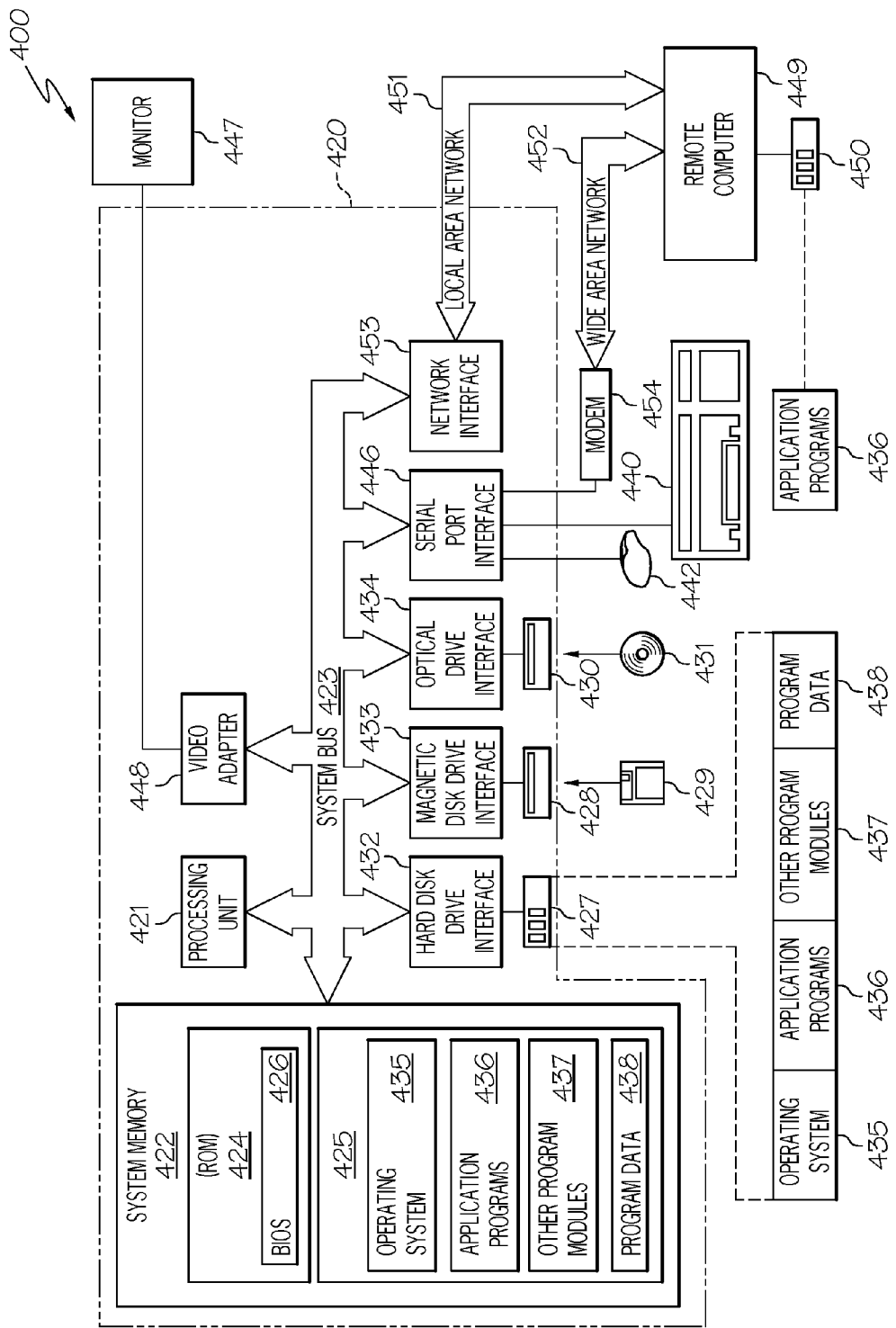
FIG. 4 is a block diagram of a computer system to implement one or more systems and methods according to an example embodiment.

FIG. 4 is a block diagram of a computer system to implement methods according to an example embodiment. In the embodiment shown in FIG. 4, a hardware and operating environment is provided that may be used to perform one or more of the methods described above. More or fewer elements shown may be utilized in various implementations.

As shown in FIG. 4, one embodiment of the hardware and operating environment includes a general purpose computing device in the form of a computer 400 (e.g., a personal computer, workstation, or server), including one or more processing units 421, a system memory 422, and a system bus 423 that operatively couples various system components including the system memory 422 to the processing unit 421. There may be only one or there may be more than one processing unit 421, such that the processor of computer 400 comprises a single central-processing unit (CPU), or a plurality of processing units, commonly referred to as a multiprocessor or parallel-processor environment. In various embodiments, computer 400 is a conventional computer, a distributed computer, or any other type of computer.

The system bus 423 can be any of several types of bus structures including a memory bus or memory controller, a peripheral bus, and a local bus using any of a variety of bus architectures. The system memory can also be referred to as simply the memory, and, in some embodiments, includes read-only memory (ROM) 424 and random-access memory (RAM) 425. A basic input/output system (BIOS) program 426, containing the basic routines that help to transfer information between elements within the computer 400, such as during start-up, may be stored in ROM 424. The computer 400 further includes a hard disk drive 427 for reading from and writing to a hard disk, not shown, a magnetic disk drive 428 for reading from or writing to a removable magnetic disk 429, and an optical disk drive 430 for reading from or writing to a removable optical disk 431 such as a CD ROM or other optical media.

The hard disk drive 427, magnetic disk drive 428, and optical disk drive 430 couple with a hard disk drive interface 432, a magnetic disk drive interface 433, and an optical disk drive interface 434, respectively. The drives and their associated computer-readable media provide non volatile storage of computer-readable instructions, data structures, program modules and other data for the computer 400. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 429, optical disk 431, ROM 424, or RAM 425, including an operating system 435, one or more application programs 436, other program modules 437, and program data 438. Programming for implementing one or more processes or method described herein may be resident on any one or number of these computer-readable media.

A user may enter commands and information into computer 400 through input devices such as a keyboard 440 and pointing device 442. Other input devices (not shown) can include a microphone, joystick, game pad, satellite dish, scanner, or the like. These other input devices are often connected to the processing unit 421 through a serial port interface 446 that is coupled to the system bus 423, but can be connected by other interfaces, such as a parallel port, game port, or a universal serial bus (USB). A monitor 447 or other type of display device can also be connected to the system bus 423 via an interface, such as a video adapter 448. The monitor 447 can display a graphical user interface for the user. In addition to the monitor 447, computers typically include other peripheral output devices (not shown), such as speakers and printers.

The computer 400 may operate in a networked environment using logical connections to one or more remote computers or servers, such as remote computer 449. These logical connections are achieved by a communication device coupled to or a part of the computer 400; the invention is not limited to a particular type of communications device. The remote computer 449 can be another computer, a server, a router, a network PC, a client, a peer device or other common network node, and typically includes many or all of the elements described above I/O relative to the computer 400, although only a memory storage device 450 has been illustrated. The logical connections depicted in FIG. 4 include a local area network (LAN) 451 and/or a wide area network (WAN) 452. Such networking environments are commonplace in office networks, enterprise-wide computer networks, intranets and the internet, which are all types of networks.

When used in a LAN-networking environment, the computer 400 is connected to the LAN 451 through a network interface or adapter 453, which is one type of communications device. In some embodiments, when used in a WAN-networking environment, the computer 400 typically includes a modem 454 (another type of communications device) or any other type of communications device, e.g., a wireless transceiver, for establishing communications over the wide-area network 452, such as the internet. The modem 454, which may be internal or external, is connected to the system bus 423 via the serial port interface 446. In a networked environment, program modules depicted relative to the computer 400 can be stored in the remote memory storage device 450 of remote computer, or server 449. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
receiving an input file containing a mark-up language based description of a syntax diagram having multiple elements and variations for multiple elements describing a set of test case queries;
checking and validating the syntax diagram via a parser running on a processor; and
generating and storing, on a computer readable medium, the set of test case queries by calculating permutations of the elements in the syntax diagram.

2. The method of claim 1 and further comprising executing the set of test cases on a query execution engine.

3. The method of claim 1 wherein the mark-up language is XML, and the test case queries are SQL queries.

4. The method of claim 3 wherein the XML description of the syntax diagram identifies literal text, markers, and rules.

5. The method of claim 4 wherein multiple markers are resolved into multiple sets of markers.

6. The method of claim 5 wherein literal text is resolved into multiple sets of literal text.

7. The method of claim 6 wherein a number of permutations are calculated based on a product of the numbers in each of the multiple sets of markers and literal text.

8. The method of claim 3 wherein the XML description of the syntax diagram contains tags comprising at least one or more of <DEFINITIONS>, <ITEM>, and <MARKER>.

9. The method of claim 3 wherein the input file is specified via an argument.

10. The method of claim 9 wherein the test cases are passed to the computer readable medium as an argument.

11. A system comprising:
a processor; and
a storage device having code to cause the processor to execute:
a test case generator running on a processor to receive an input file containing a mark-up language based description of a syntax diagram having multiple elements and variations for multiple elements describing a set of test case queries;
a parser running on the processor to check and validate the syntax diagram; and
the test case generator further running on a processor to generate and store, on a computer readable medium, the set of test case queries by calculating permutations of the elements in the syntax diagram.

12. The system of claim 11 wherein the mark-up language is XML, and the test case queries are SQL queries.

13. The system of claim 12 wherein the XML description of the syntax diagram identifies literal text, markers, and rules.

14. The system of claim 13 wherein multiple markers are resolved into multiple sets of markers, wherein literal text is resolved into multiple sets of literal text, and wherein a number of permutations are calculated based on a product of the numbers in each of the multiple sets of markers and literal text.

15. The system of claim 13 wherein the XML description of the syntax diagram contains tags comprising at least one or more of <DEFINITION>, <ITEM>, and <MARKER>.

16. A non-transitory computer program product comprising a computer readable medium having instructions to cause a computer to execute a method, the method comprising:
receiving an input file containing a mark-up language based description of a syntax diagram having multiple elements and variations for multiple elements describing a set of test case queries;
checking and validating the syntax diagram via a parser running on a processor; and
generating and storing, on a computer readable medium, the set of test case queries by calculating permutations of the elements in the syntax diagram.

17. The non-transitory computer program product of claim 16 wherein the mark-up language is XML, and the test case queries are SQL queries, and wherein the XML description of the syntax diagram identifies literal text, markers, and rules.

18. The non-transitory computer program product of claim 17 wherein multiple markers are resolved into multiple sets of markers, wherein literal text is resolved into multiple sets of literal text, and wherein a number of permutations are calculated based on a product of the numbers in each of the multiple sets of markers and literal text.

19. The non-transitory computer program product of claim 17 wherein the XML description of the syntax diagram contains tags comprising at least one or more of <DEFINITIONS>, <ITEM>, and <MARKER>.

20. The non-transitory computer program product of claim 17 wherein the input file is specified via an argument, and wherein the test cases are passed to the computer readable medium as an argument.

* * * * *